March 28, 1944. K. SCHRÖTER ET AL 2,345,159
CARS, ESPECIALLY TRAILERS, WITH TILTABLE BODIES
Filed Jan. 13, 1941 2 Sheets-Sheet 1
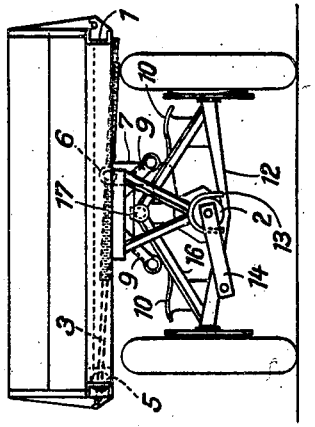
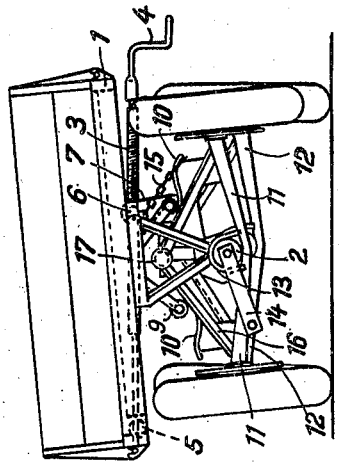
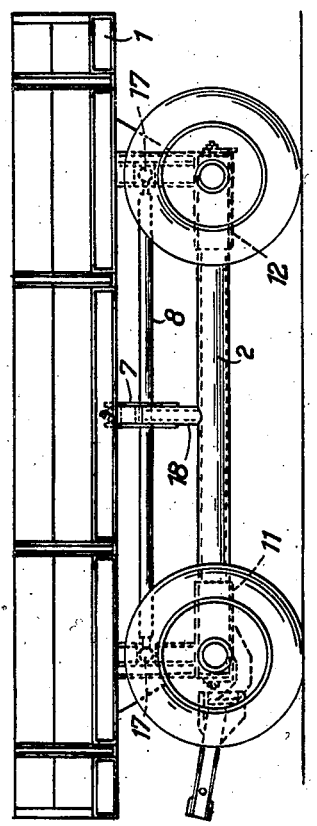
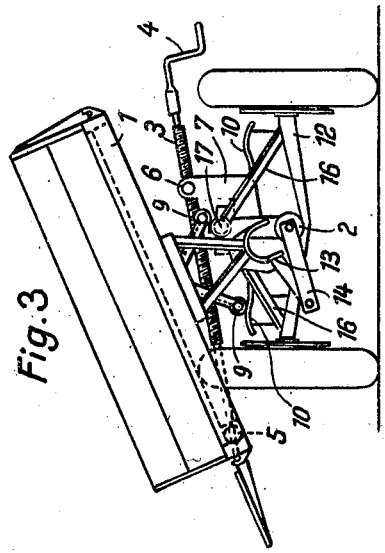
Inventors:
Kurt Schröter and Hans Schröter
Richards & Geier
ATTORNEYS

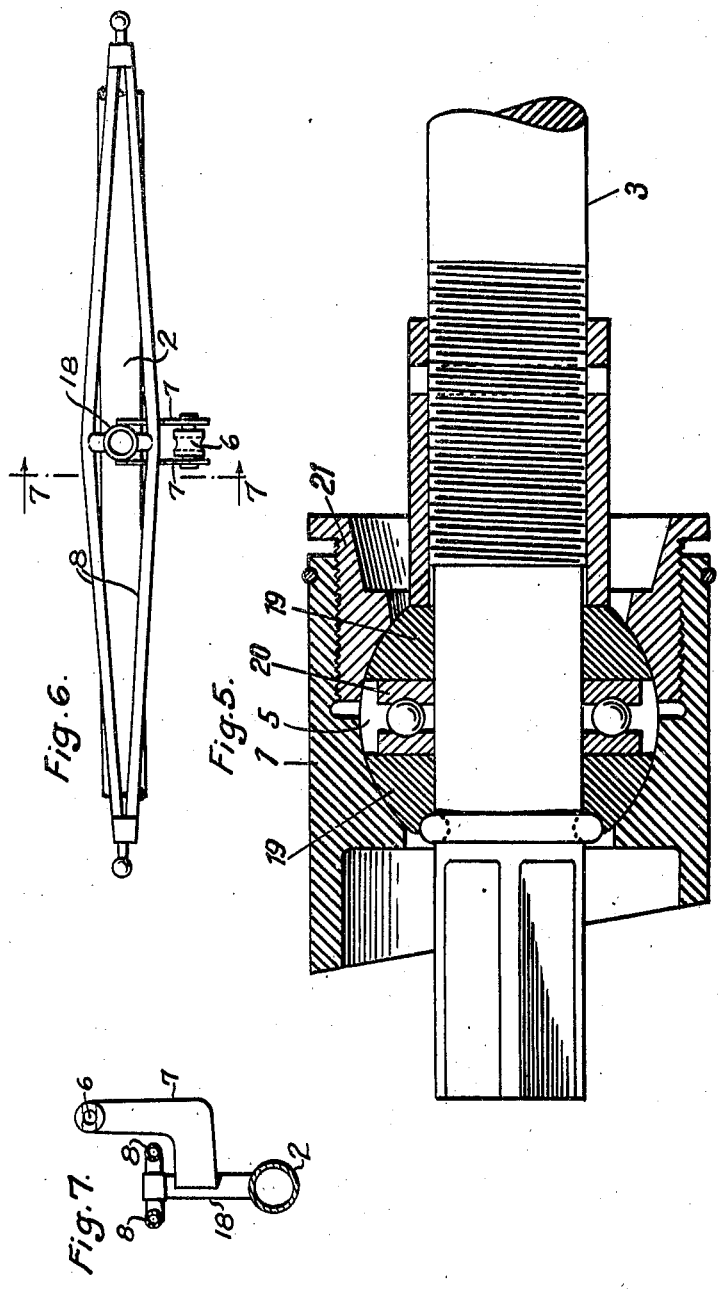

Patented Mar. 28, 1944

2,345,159

UNITED STATES PATENT OFFICE 2,345,159

CAR, ESPECIALLY TRAILER, WITH TILTABLE BODY

Kurt Schröter and Hans Schröter, Wechmar, Gotha-Land, Germany; vested in the Alien Property Custodian Application January 13, 1941, Serial No. 374,217
In Germany May 29, 1937

7 Claims. (Cl. 280—6)

Our invention relates to vehicles, especially trailers, with tiltable bodies, and has for one of its objects equipping vehicles with a compensation device arranged to tend to swing one axle in a direction contrary to the movement of the second axle when the latter is being swung, as when the vehicle is running on uneven ground, whereby the wheeled underframe maintains a balanced position between the two axles.

In freight cars, trailers, and like vehicles, particularly when used for agriculture work or in yards where building construction is proceeding, there arises the drawback that the uneven ground produces strong torsional strains on the frame members and associated parts, rendering difficult the usual operations of tilting the bodies and moving the vehicles wherever desired. The present invention is designed to overcome such drawbacks. By virtue of applicant's arrangement of tilting body, compensating device and wheel-supporting underframe, the vehicles equipped in accordance with the present invention can be readily tilted relatively to the wheeled underframe despite uneven ground conditions, and without impairing the stability of the vehicle.

Another advantage of the present invention is that it permits the use of the body tilting mechanism to lift a single wheel from the ground, as, for example, when a tire must be replaced on such wheel.

A further advantage presented by our invention is that the car body is guided during the tilting, and the movement of the axle frames in upward direction is restricted. The car designed according to this invention is, for said purpose, provided with supporting rolls and curved lugs engaging one another when the body of the car is tilted so that said rolls roll along upon said lugs and the supporting bearings of the tiltable body are lifted off the frame carriers. This arrangement renders it possible to obtain a sufficiently large tilting angle even if the loading surface is perhaps, located approximately near the ground, the center of gravity of the load being, nevertheless, not elevated during the tilting procedure.

The invention is illustrated diagrammatically and by way of example in the accompanying drawings in which Figure 1 is a side elevation of a trailer having a tiltable body and equipped with a compensation device according to this invention. Figure 2 is a rear elevation of said trailer, Figure 3 is a rear elevation showing the body tilted. Figure 4 is a rear elevation similar to Fig. 2, but showing one wheel lifted; Figure 5 shows partly in side elevation and partly in axial section a mechanism used when the body of the car is tilted, the mechanism proper being shown in section and a spindle supporting it being shown in side elevation.

Figure 6 is a plane view showing the compensation device and Figure 7 is a vertical section along the line 7—7 of Figure 6.

The wheeled frame of the car, or the body 1 respectively, is tiltable with respect to the longitudinal middle carrier 2. The frame or body 1 is, for this purpose, supported together with the supporting bearings 13 upon the axle frames 11 and 12 which are turnable, together with said bearings, on said carrier 2. This latter is connected with the tiltable body 1 by a member 3 which is transversely shiftable and preferably adjustable in its longitudinal direction. Said member 3 is formed, in the example shown, by a spindle threaded throughout the major portion of its length and engaging the body 1 by threading into a portion of a ball-joint 5 substantially as shown in Fig. 5. The spindle 3 also threads through a nut 6 which is journalled in an arm 7 of the longitudinal carrier 2, substantially as shown in Figs. 3 and 6. The spindle is preferably shaped so that a handcrank 4 can be applied to either end. By turning the crank in the one or the other direction the nut 6 is correspondingly moved along the spindle 3 whereby the distance between the arm 7 which is rigidly connected with the central longitudinal carrier 2 and the ball-joint 5 mounted near one side of the frame or body 1 is varied. The body 1 will, therefore, be tilted to the one or other side according to the direction of rotation of the spindle, the body turning first on the carrier 2 with its supporting bearings 13 still in contact therewith.

The ground compensation device itself may be of any desired known design. In the form herein illustrated by way of example it includes a vertical pivot 18 (Fig. 1) attached to the longitudinal carrier 2, a compensation lever 8 being rotatable about the pivot 18. The member 8 consists of a lever in skeleton form with a central cross piece rotatable upon the pivot 18 and with ball-shaped ends which are connected by sockets 17 with axle frames 11 and 12 swingable about the longitudinal carrier 2. These axle frames carry two upwardly and inwardly directed stiffening struts 16, at the inner section of which are mounted the sockets 17 for the ends of the compensation lever 8 which is slightly movable in vertical direction upon its pivot 18 in addition to being rotatable about the pivot 18. The arm 7 is mounted upon the pivot 18 and firmly connected therewith, so that the arm 7 is firmly connected with the longitudinal carrier 2. The arm 7 consists of two spaced side pieces or brackets which are attached at their lower extremities to the pivot 18 on opposite sides thereof and carry between their upper free ends the journalled nut 6 for the spindle 3. When an axle frame is swung by an unevenness in the ground, the compensation lever 8 swings the other axle frame in the opposite direction of rotation, so that the vehicle is maintained in a middle position.

For guiding the body 1 while tilting supporting rolls 9 and curved lugs 10 are provided which are connected with said body, and with the axle frames 11 and 12 respectively. If by turning the hand crank 4 and the spindle 3 the body has been laterally swung so that the supporting rolls 9 attached to the body contact the said lugs 10, which are, at least in the example shown, attached to the two upwardly inclined stiffening struts 16, the body will when the rotation of said spindle is continued be lifted together with its supporting bearings 13 from the longitudinal carrier 2, substantially as shown in Fig. 3, the supporting rolls 9 located on the tilting side rolling upon the curved lugs 10 located on the same side. The supporting rolls serve at the same time for limiting the extent of deviation of the axle frames 11 and 12. By this arrangement the bottom of the body always clears the tires, and at the same time the advantage is attained that in spite of the tilting angle of the body 1 being the largest possible the loading surface does not lie too low in its middle position, viz, when it is not tilted.

The body is restrained by the scissor levers 14 arranged between the supporting bearings 13 and the longitudinal carrier 2, so that said bearings always return to their normal positions contacting the carrier when the body is returned from a tilted position.

The supporting bearings 13 are lifted from the longitudinal carrier 2 also when the car is running over a comparatively large obstacle in the road, viz. when the axle frames 11 and 12 are so much turned with respect to one another as well to the wheeled underframe, or the body 1 respectively, that the supporting rolls 9 contact with the curved lugs 10 of the said frames.

In all these cases the bottom of the body moves automatically in upward direction if the wheel tires approach it. It is, therefore, unnecessary to provide the bottom with so-called wheel boxes into which the upper portion of a wheel may extend.

If a wheel axle is connected with the body 1 at one side by means of a non-stretchable member, for instance a chain 15 (Fig. 4), and if the body is then laterally tilted, so that such side is raised, the wheel located in the proximity of the chain will be raised along with it, so that, for instance for exchanging a wheel tire, the otherwise requisite jacking or hoisting device can be dispensed with.

If low speeds are sufficient to attain the purposes in view, the axles need not be connected by springs with the body whereby the advantage is attained that the net weight of the car is considerably reduced.

In Fig. 5 the ball joint 5 by the intermediary of which the spindle 3 engages the tiltable body is separately illustrated and drawn on a larger scale. Said joint is provided with a transverse ball bearing 20 active at both sides and inserted between two half-spheres 19 turnably supported in correspondingly shaped hollow bearings and able to take up the lateral pressure. The hollow bearing is bipartite and one of its parts (21) is adjustably connected with the other, stationary part for instance by means of screw-threads. This other part may be made integral with the body 1, if desired. By designing the ball-joint 5 in this manner the friction arising within it is greatly reduced.

We claim:

1. A car, comprising, in combination, a wheeled underframe, at least two wheel axles forming parts of said frame and adapted to be swung relatively to one another, on a longitudinal middle carrier common to them, a tiltable body, a compensation device connecting said axles with one another and with said body, bearings supporting the body relatively to said middle carrier, and supporting rolls and curved lugs attached to said wheeled underframe, said rolls rolling along upon said lugs when the body is being tilted and lifting said supporting bearings of the body from the said longitudinal middle carrier.

2. A car, comprising, in combination, a wheeled underframe, at least two wheel axles forming parts of said frame and adapted to be swung relatively to one another on a longitudinal middle carrier common to them, a tiltable body, a compensation device connecting said axles with one another and with said body, bearings supporting the body relatively to said middle carrier, supporting rolls and curved lugs attached to said wheeled underframe, said rolls rolling along upon said lugs when the body is being tilted and lifting said supporting bearings of the body from the said longitudinal middle carrier, and a member guiding the supporting bearings and making the tiltable body again contact with the longitudinal carrier when being rearwardly moved.

3. A car, comprising, in combination, a wheeled underframe, at least two wheel axles forming part of said frame and adapted to be swung relatively to one another on a longitudinal middle carrier common to them, a tiltable body, a compensation device connecting said axles with one another and with said body, bearings supporting the body relatively to said middle and being connected with the longitudinal middle carrier by lugs connected like scissors with one another, and supporting rolls and curved lugs attached to said wheeled underframe, said rolls rolling along upon said lugs when the body is being tilted and lifting said supporting bearings of the body from the said longitudinal middle carrier.

4. A car, comprising, in combination, a wheeled underframe, at least two wheel axles forming parts of said frame and adapted to be swung relatively to one another, on a longitudinal middle carrier common to them, a tiltable body, a compensation device connecting said axles with one another and with said body, and an adjusting mechanism comprising a spindle, a ball-joint engaging the tiltable body, and a turnable joint nut supported at an arm connected with the longitudinal middle carrier.

5. A car, comprising, in combination, a wheeled underframe, at least two wheel axles forming parts of said frame and adapted to be swung relatively to one another, on a longitudinal middle carrier common to them, a tiltable body, a compensation device connecting said axles with one another and with said body, and an adjusting mechanism comprising a ball-joint consisting of a transverse ball bearing acting in two directions and being connected with said tiltable body, and a turnable joint nut supported in an arm connected with the said longitudinal middle carrier.

6. A car, comprising, in combination, a wheeled underframe, at least two wheel axles forming parts of said frame and adapted to be swung relatively to one another on a longitudinal middle carrier common to them, a tiltable body, a compensation device connecting said axles with one another and with said body, and an adjusting mechanism comprising a ball-joint consisting of a transverse ball bearing acting in two directions and being arranged between two half-spheres and within bearing brasses lying within a hollow ball bearing, and of a joint-nut located upon said adjusting mechanism and being supported in an arm connected with the said longitudinal middle carrier.

7. A car, comprising, in combination, a wheeled underframe, at least two wheel axles forming parts of said frame and adapted to be swung relatively to one another on a longitudinal middle carrier common to them, a tiltable body, a compensation device connecting said axles with one another and with said body, and a draft member connecting said body with every wheel axle and being able to lift a wheel from the bottom when the said body is tilted.

KURT SCHRÖTER.
HANS SCHRÖTER.